United States Patent [19]
Carlson et al.

[11] 3,762,835
[45] Oct. 2, 1973

[54] FOREIGN OBJECT DAMAGE PROTECTION FOR COMPRESSOR BLADES AND OTHER STRUCTURES AND RELATED METHODS

[75] Inventors: Robert G. Carlson, Greenhills;
Joseph H. Crawford, Cincinnati;
Edward R. Farmer, Reading; Guy C. Murphy, Fairfield; Charles T. Salemme, Madeira, all of Ohio

[73] Assignee: General Electric Company

[22] Filed: July 2, 1971

[21] Appl. No.: 159,111

[52] U.S. Cl.............. 416/224, 416/230, 29/156.8 B
[51] Int. Cl................................................ F01d 5/28
[58] Field of Search.................. 416/224, 229, 230; 29/156.8 B, 471.9, 472.5, 472.9, 473.1, 527.2

[56] References Cited
UNITED STATES PATENTS

| | | | |
|---|---|---|---|
| 1,860,557 | 5/1932 | Sukohl | 416/224 |
| 3,041,040 | 6/1962 | Levinstein | 416/224 |
| 3,645,829 | 2/1972 | Palfreyman et al. | 29/156.8 B |
| 3,637,325 | 1/1972 | Morley | 416/224 |
| 2,767,461 | 10/1956 | Lebold et al. | 29/156.8 B |
| 2,897,583 | 8/1959 | Patrichi | 29/472.5 |
| 2,477,375 | 7/1949 | Jablonsky | 416/230 |

FOREIGN PATENTS OR APPLICATIONS

| | | | |
|---|---|---|---|
| 596,636 | 1/1948 | Great Britain | 416/230 |
| 311,010 | 2/1919 | Germany | 416/224 |

*Primary Examiner*—Samuel Feinberg
*Attorney*—Derek P. Lawrence et al.

[57] ABSTRACT

A filament composite compressor blade is provided with a fine wire mesh subsurface layer around its leading edge. This subsurface layer is clad with nickel. Internal mesh layers are also incorporated in the blade adjacent its leading edge. The wire mesh provides protection against impact damage by large and small foreign objects such as stones and sand. Where the subsurface mesh layer is bonded in place by a non-conductive adhesive, the adhesive in the interstices of the mesh is coated with silver and the nickel is atomically bonded to the nubs of the mesh. Also described is a novel method of incorporating the internal mesh layers in a blade formed from laminates of filament/matrix material.

5 Claims, 14 Drawing Figures

PATENTED OCT 2 1973 3,762,835

INVENTORS.
ROBERT G. CARLSON
JOSEPH H. CRAWFORD
EDWARD R. FARMER
GUY C. MURPHY
CHARLES T. SALEMME
BY
ATTORNEY

INVENTORS.
ROBERT G. CARLSON
JOSEPH H. CRAWFORD
EDWARD R. FARMER
GUY C. MURPHY
CHARLES T. SALEMME

BY

ATTORNEY

PATENTED OCT 2 1973 3,762,835

INVENTORS.
ROBERT G. CARLSON
JOSEPH H. CRAWFORD
EDWARD R. FARMER
GUY C. MURPHY
CHARLES T. SALEMME

BY

ATTORNEY

FOREIGN OBJECT DAMAGE PROTECTION FOR COMPRESSOR BLADES AND OTHER STRUCTURES AND RELATED METHODS

The present invention relates to improvements in compressor blades employed in gas turbine engines for the propulsion of aircraft. More specifically, the invention relates to such blades which have an improved capability of withstanding damage when struck by foreign objects. Broader aspects of the invention relate to providing this capability for other composite and/or lightweight structures. Related aspects of the invention are directed to methods whereby these ends are attained. The invention herein described was made in the course of or under a contract, or a subcontract thereunder, with the United States Department of the Air Force.

The motivating environment for the present invention is found in aircraft gas turbine engines where engine weight is a highly important factor in over-all engine/aircraft performance. For many years attempts have been made to replace the relatively heavy, homogeneous metal blades and vanes of engine compressors with lighter composite materials. The primary efforts in this direction have been toward the use of high strength, elongated filaments composited in a lightweight matrix. Early work involved glass fibers and more recent efforts have been directed toward the utilization of boron and graphite filaments. These later materials have extremely high strength characteristics as well as high moduli of elasticity which contribute to the necessary stiffness of the compressor blades and vanes.

Many problems have confronted the efforts to utilize these filaments, particularly in adapting their unidirectional strength characteristics to a multidirectional stress field. To a large extent, these problems have been overcome and composite blades have been demonstrated with performance characteristics, in most areas, equal to or better than their homogeneous metal counterparts in addition to providing the expected and significant weight reductions.

However, composite blades have not been introduced into operational service due, to a large extent, to their vulnerability to what is referenced as foreign object damage. Many types of foreign objects may be entrained in the inlet of an aircraft gas turbine engine ranging from large birds, such as sea gulls, to hail stones, to sand, to rain. Damage from foreign object damage takes two forms. Smaller objects can erode the blade material and degradate the performance of the compressor. Impact by larger objects can rupture or pierce the blades. Portions of an impacted blade can be torn loose and cause extensive secondary damage to other blades and other engine components. This is not only hazardous, if not disasterous, but expensive to repair as well.

In this regard, the consequences of foreign object damage are greatest in the low pressure compressors, or fans, of bypass turbine engines which, at the same time, offer the greatest potential in realizing the advantages of composite blades due to their large tip diameters, as great as 8 feet, and spans in the order of 2 or more feet.

The vulnerability of composite blades to foreign object damage is due to two factors. First, the lightweight matrix materials employed, generally polymeric resins or metals such as aluminum, are relatively soft. Second, the high strength filaments are relatively hard and brittle.

From this it would seem evident that a protection system involving a hard surface coating should be provided for these composite blades and vanes. This is even more evident from the early recognition in the aviation industry that such protective systems were desirable for wooden propeller blades and propeller blades formed of early composite materials such as cloth fabric in a phenolic resin matrix. Many such systems have been proposed. They include claddings, for the leading edge portions, or the entire surface, of a propeller in the form of sheet metal, canvas, hard and soft rubber, coarse wire metal and several hard metal coatings (spray applied and plated) singularly and in various combinations. Other systems have proposed, alternatively or additionally, that internal metal reinforcements should be incorporated in propeller blades fabricated of composite material.

While such prior proposals may have been adequate, to a greater or lesser extent, for operational requirements of earlier propeller driven aircraft, they are not adequate for the protection of more advanced composite materials which otherwise meet the requirements of compressor blades for gas turbine engines that now propel high performance aircraft.

In the case of compressor blades, particularly fan blades, one important factor is the high centrifugal loading imposed during operation. Not only does this have an affect on the rupture of a blade impacted by a foreign object, it is of great significance to the structural integrity, during normal operation, to a blade provided with a protection system. Generally speaking, the centrifugal loading on turbine compressor blades is significantly higher, in the order of orders of magnitude, than found in wooden, or earlier composite propeller blades. Another factor of significance is the relative growth of the composite material and the materials of the protection system due to dynamic loadings or thermal transients. Such relative growth can adversely affect the structural integrity of the blades. Little or no account of these relative growth factors is taken into account in any of the prior protection system proposals. Related to the thermal relative growth factor is the effect of elevated temperatures, per se, which can adversely affect the structural integrity of a blade protection system. Another factor, also absent from prior considerations, is the order of magnitude of velocity at which impact can occur between an object and a rotating fan blade. The peripheral speed of fan blades can exceed 1,500 feet per second while the relative velocity of a bird and aircraft might be in the order of 720 feet per second. This gives a potential impact velocity of over 2,200 feet per second — within the range of the muzzle velocity of a rifle. Impact velocities of this magnitude were not contemplated in any known prior teachings concerning protection systems. Yet another factor to be taken into account in high speed compressor blades and protection systems therefor is the extremely small radii of their leading edges and their thin cross sections, particularly at their outer or tip ends.

Accordingly, one object of the invention is to provide, for gas turbine engine compressors, improved filament composite blades which incorporate a foreign object damage system, such system being compatible with the above and other pertinent factors relative to the operating environment of high performance aircraft, gas turbine engines where foreign object impact is to be encountered.

Compressor vanes, engine struts and aircraft components, including radomes, represent other structures which may advantageously be fabricated from filament composite material or other lightweight material vulnerable to foreign object damage. These structures also operate under severe environmental conditions of high vibration and temperature extremes.

Accordingly, another object of the invention is to provide improved structures, of the type referenced above, which have a foreign object damage protection system capable of functioning under a wide variety of severe environmental conditions.

A preferred method of fabricating filament composite structures, such as compressor blades and vanes, is to cut laminates from thin sheet material having parallel fibers supported by bondable matrix material. These laminates are assembled in stacked relationship and molded to solidify the matrix material and impart the desired shape to the composite article.

Another object of the invention is to provide a method for incorporating wire mesh elements of a foreign object damage protection system into a filament composite structure consistent with the aboveferenced laminate method of fabrication.

Yet another object of the invention is to provide an improved method of electroplating an essentially smooth and firmly anchored hard metal coating to a non-conductive substrate as found in resin/filament composites. This object is ancillary and related to the above objects of providing a foreign object damage protection system as will later be more apparent.

Certain aspects of the above ends are obtained through the provision of a compressor rotor blade having a cambered airfoil section which is formed of elongated, small diameter filaments, having high strength and modulus of elasticity, which are composited into a lightweight matrix and form a major portion of the airfoil. A subsurface wire mesh layer extends from one side to the other of the airfoil section at least marginally of its leading edge and from its tip end a substantial distance toward its hub end. The wire mesh is closely woven of small diameter wire and its interstices are filled with a bonding agent that is bonded to the matrix. A hard metal cladding is further bonded to the airfoil in overlying relation with the subsurface wire mesh.

Preferably, the wire mesh is formed of a tough metal and has a wire diameter between about 0.001 and 0.005 inches. The weave of the mesh and the spacing between adjacent wires maintains between about 20 – 60 volume percent of wire metal within the outline of the mesh layer. The metal cladding is nickel, preferably having a thickness between about 0.002 and 0.050 inches.

Further, it is preferred that the mesh be square woven and disposed with its wires angled at approximately 45° relative to the leading edge of the airfoil portion with the nickel cladding having a thickness of 0.010 to 0.050 inches at the leading edge tapering to a thickness of about 0.002 to 0.005 inches at the trailing portions of the subsurface layer. Additionally, the nickel preferably has a greater ductility than the filament/matrix system of the blade.

Another feature is found in the bonding of the hard metal layer atomically to the outer nubs of the subsurface mesh layer. Yet another feature is found in wrapping the subsurface mesh layer uninterruptedly around the leading edge of the airfoil section.

Additional foreign object protection is attained by providing internal mesh layers similar to the subsurface mesh layer. The internal mesh layers are generally parallel to the adjacent surfaces of the blade and are offset so that no more than two trailing edges of the internal mesh layers are registered in the general plane of the blade.

In a broader sense, the above ends are fulfilled by a structure, and particularly a non-conductive primary structure, having subsurface layer of closely woven small diameter wire mesh bonded to the primary structure by a bonding agent filling the interstices of the wire mesh with a hard metal coating atomically bonded to the outer nubs of the wire mesh.

In one method aspect of the invention, a composite article is formed by cutting a plurality of laminates from sheet material formed of generally parallel elongated filaments held in place by matrix material. A damage protection element is then cut from sheet material comprising woven wire mesh embedded in a bonding agent bondable with said matrix material. The mesh sheet has a thickness which is compactible during molding to substantially an even integer of the compactible thickness of the filament sheet. The laminates are assembled with one filament laminate underlying the protecting element and a sufficient number of filament laminates to equal the compactible thickness of the protecting element and in edgewise contiguous relation to the protection element. This assembly is molded under heat and pressure sufficient to form a solid matrix for the elements for the wire mesh incorporated without adversely affecting the load carrying capabilities of the filaments.

Another method aspect is found in applying a protective metal coating to a non-conductive substrate wherein a woven wire mesh is incorporated into the substrate as a surface layer by means of a bonding agent which fills the interstices of the wire mesh with the outer nubs of the mesh exposed. A thin conductive layer, preferably silver, is selectively coated to the outer surface of the bonding agent in the interstices of the mesh. The metal cladding is then deposited electrolytically on the conductive surface compositely formed by the silver and exposed nubs, providing a smooth, uniform thickness with good adhesion being obtained through the multiplicity of atomic bonds between the mesh nubs and the coated metal, or electroplated cladding.

The above and other related objects and features of the invention will be apparent from a reading of the following description of the accompanying drawings and the novelty thereof pointed out in the appended claims. In the drawings:

Figures 1, 2, 3, 4:
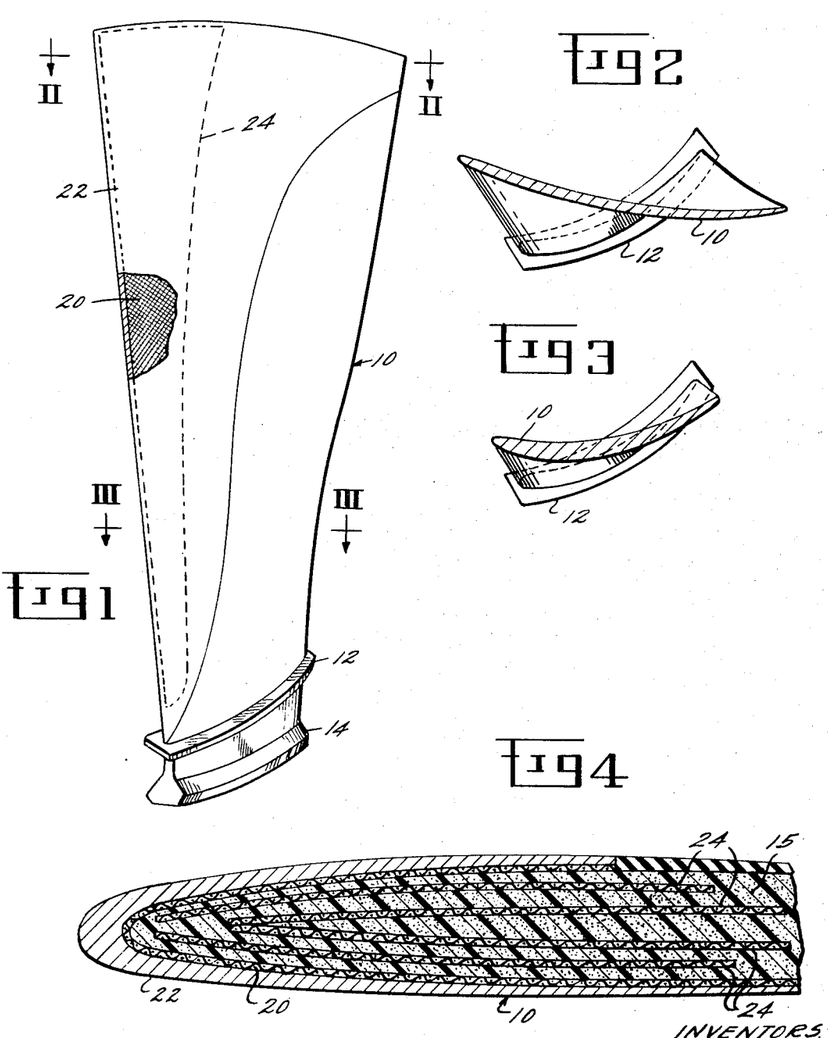
FIG. 1 is a perspective view of a compressor blade embodying the present invention.
FIG. 2 is a section taken on line II—II in FIG. 1.
FIG. 3 is a section taken on line III—III in FIG. 1.
FIG. 4 is a section, on an enlarged scale, taken on line II—II of the leading edge portion of the blade.

FIGS. 1 – 3 illustrate a composite rotor blade, according to the present invention, for use in the low pressure, axial flow compressor or fan of a turbofan engine. FIGS. 2 and 3 illustrate both the twist as well as the progressive change and cross-sectional thickness and camber from tip to hub in the cambered airfoil portion 10 thereof. A rub strip 12 is formed at the hub of the airfoil portion 10 to engage platform sections on the compressor rotor and minimize crushing of the materials in the airfoil. A circular arc dovetail tang 14 at the hub end of the blade enables it to be mounted on a rotor in a conventional fashion.

The major portion, or primary structure, of this blade comprises elongated graphite fibers embedded in a polymeric resin matrix forming a filament/resin composite 15. For a better understanding of the foreign object damage protection system of the present invention, a brief description will be given of the preferred procedures employed in forming filament composite blades. Thin filament/resin sheets 16 (FIG. 7) are utilized. These sheets comprise partially cured polymeric resin having a multiplicity of graphite filaments embedded therein in generally equispaced parallel relation. An epoxy is a suitable polymeric resin, one form of which is available under the trademark Ferrow E 293. The sheet 16 may be formed by orienting the filaments and impregnating them with the epoxy resin. Through the application of heat, in a known fashion, to a precursor filament, it is transformed into a graphite, crystalline structure. Such graphite filaments are characterized by a small diameter, approximately 0.0002 inches, a high tensile strength, approximately 250,000 p.s.i. to 500,000 p.s.i. and a high modulus of elasticity of 25 – 45 million p.s.i. Suitable graphite filaments are commercially available under the trademarks Modmor I and Modmor II.

Figure 10:
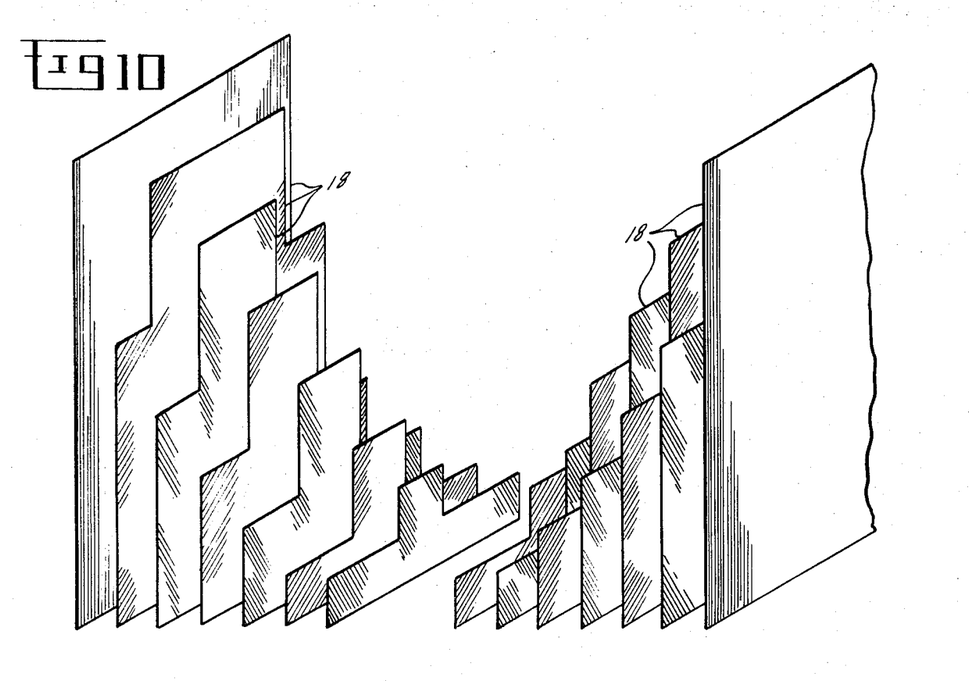
FIG. 10 illustrates, in perspective, the manner of assemblying laminates in the manufacture of the present blade.

As noted on the drawing, a typical thickness of a sheet 16 is 0.007 inches. An individual blade is then formed from a plurality of laminates 18 cut from the sheets 16, as illustrated in FIG. 10. The filaments, in the laminates, extend generally lengthwise of the blade with the filaments in selected laminates being angled to adapt the unidirectional strength characteristics of the filaments to the multidirectional stress field in which the blade will operate. The laminates are of varying contour (not specifically as indicated in FIG. 10) to provide the tapering blade cross section illustrated in FIGS. 2 and 3. The assembly of laminates 18 is placed in a mold and, with the application of heat and pressure, the epoxy resin is fully cured or polymerized to form a composite blade.

To provide greatest protection capabilities for such filament composite blades, the present foreign object damage protection system comprises several layers of wire mesh. First there is a subsurface wire mesh layer 20 (FIGS. 4 and 5) which is wrapped around the leading edge of the blade. The subsurface mesh layer extends a short distance marginally along the suction surface or side of the blade from the blade tip to a point adjacent of the blade hub. On the pressure surface or side of the blade, the wire mesh angles or curves from the leading edge, at the hub, toward the trailing edge at the tip of the blade as will be evident from FIG. 1 where the subsurface wire mesh is shown with a nickel cladding 22. The nickel cladding 22 will be further referenced in detail. Further, wire mesh layers 24 (indicated generally in FIG. 1) are disposed internally of the blade as illustrated in FIGS. 2 and 3. The internal mesh layers are generally parallel to the adjacent surfaces of the blade. They extend (FIG. 1) from the tip of the blade to the hub stopping short of the tang 14. The internal mesh layers are also tapered from the tip end of the blade inwardly toward the hub end. Due to the increasing cross section of the blade, there is a relatively large volume percent of the internal mesh at the tip end of the blade which percent progressively decreases toward the hub end due both to the increasing blade thickness, made up from additional filaments and resin, and the tapering of the internal mesh layers. It will also be noted that the internal wire mesh layers are staggered so that no more than two edges of the mesh are in register in the general plane of the blade and thus abrupt changes in volume percent of the mesh are minimized. This minimizes the likelihood of a fracture occurring along the edges of the internal wire mesh layers when the blade is stressed to normal levels during operation as well as upon impact by a large foreign object.

Figures 5, 6, 7:
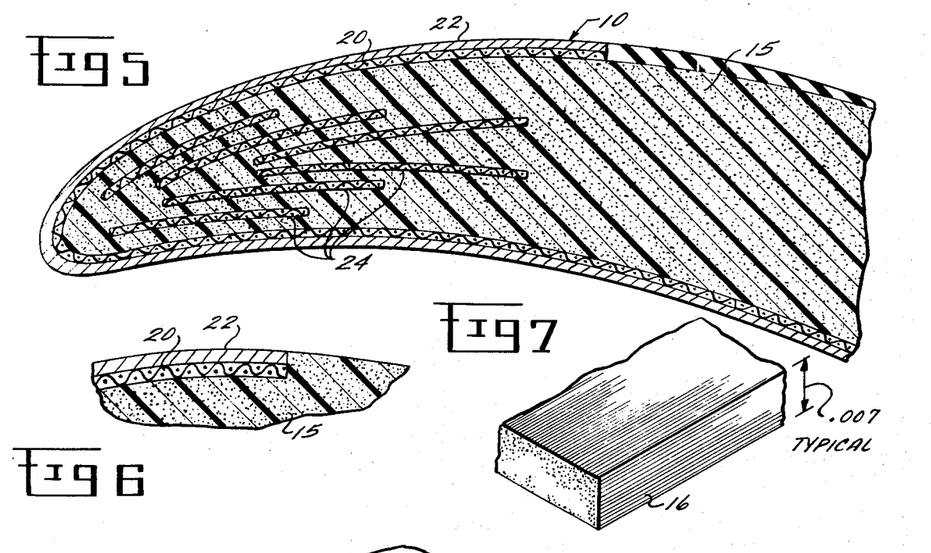
FIG. 5 is a section, on an enlarged scale, taken on line III—III of the leading edge portion of the blade.
FIG. 6 is a fragmentary section showing an alternate form of a portion of FIGS. 4 and 5.
FIG. 7 is a greatly enlarged, perspective view of a filament/resin sheet used in fabricating the present blade.
Figure 11:
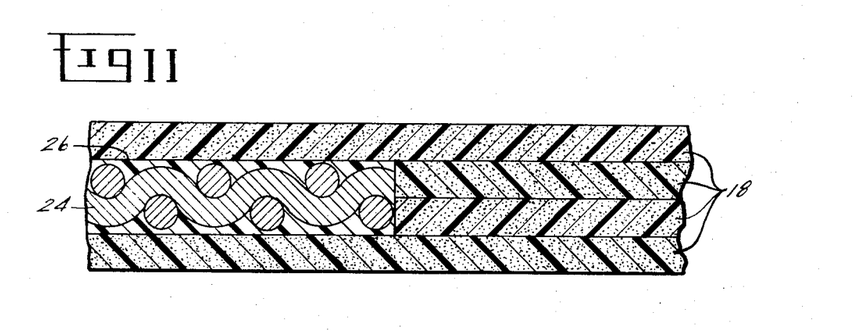
FIG. 11 is a section, on a greatly enlarged scale, of a portion of the laminate assembly.

The scale of FIGS. 4 and 5 does not permit a full appreciation of the relative sizes of the wire mesh and the filaments. This can be obtained by again referencing the filament/resin sheet 16 of FIG. 7 and comparing it with FIG. 8. The latter figure illustrates an internal wire mesh/resin sheet 26 as it would be incorporated into a blade fabrication assembly. The wire mesh is embedded in epoxy resin. A suitable wire mesh is a 100 mesh stainless steel cloth formed of 0.0045 inches diameter wire and having a total thickness of 0.009 inches. The combined thickness of the epoxy/wire mesh sheet is approximately 0.014 inches or twice the thickness of the epoxy/filament sheet from which the blade laminates are formed. In incorporating the internal mesh layers the epoxy/filament laminates are cut away where the mesh layers are to be disposed. While the thickness of the mesh/resin sheet 26 is approximately an even integer of the thickness of the filament/resin sheet 16, more important, this integer relationship is more precisely attained after compaction of the sheets in the molding operation. This is illustrated in FIG. 11 which shows that with having the compacted thickness of the epoxy/mesh layer being an even multiple, or integer, of the compacted laminates 18 there will be a minimum distortion or displacement of the filaments and resin during the molding process. Further, with the wire mesh interstices being essentially prefilled with epoxy resin, this resin cross links with the epoxy of the laminates to firmly anchor the internal mesh layers during the molding process.

Figure 9:
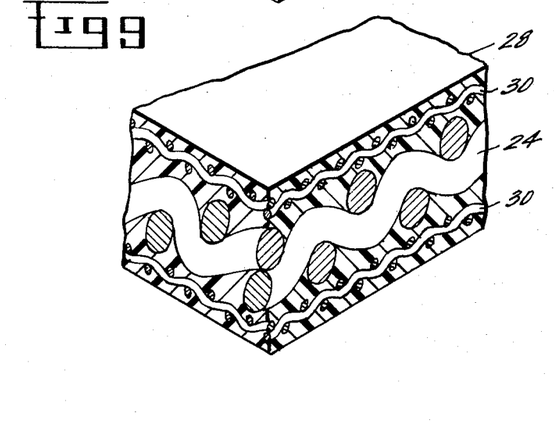
FIG. 9 is a greatly enlarged, perspective view of an alternate mesh/resin sheet for use in fabricating blades.

FIG. 9 illustrates an alternate wire mesh sheet 28 which additionally incorporates a scrim cloth of loosely woven, fibers 30 (such as of fiberglass) which function as a carrier for the epoxy resin in fabricating the sheet 28. The compactible thickness of the sheet 28 is also an even integer of the compactible thickness of the filament sheet 16, being three times thicker. Thus, in fabrication, three laminates would be used in side-by-side relation with a protecting element formed from the sheet 28.

The subsurface mesh layer 20 can be incorporated during the blade molding operation or applied after the blade laminates are molded. The latter procedure is more practical for low volume production. Thus, the outer mesh layer can be wrapped around the molded blade laminates and coated with a suitable bonding agent such as epoxy resin filled with aluminum powder. Heat and pressure, as in an autoclave, are then applied to cure the resin and bond the outer layer in place. As will be noted from FIGS. 4 and 5, the outer mesh layer is applied to the smoothly curved, basic airfoil configuration of the blade which had been obtained by molding the laminates 18. As such, it projects, along with the nickel coat 22, beyond the nominal airfoil outline, in step fashion at its trailing edges. This "step" is filled in with cured polyurethane 32 which is feathered from the trailing edge portions of the subsurface mesh layer/nickel into the primary airfoil cross section as illustrated.

Figure 8:
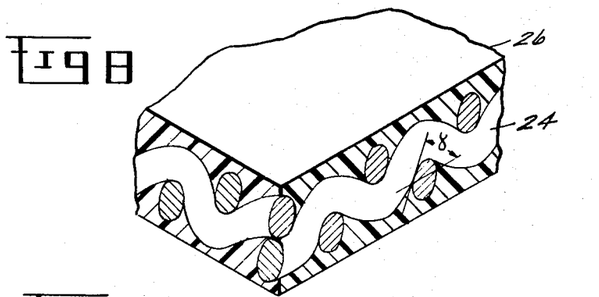
FIG. 8 is a greatly enlarged, perspective view of a wire mesh/resin sheet used in fabricating the present blade.

FIG. 8 illustrates an alternate approach to applying the subsurface mesh layer 20 and cladding 22. As shown, the primary molded structure is recessed in the areas where the mesh/cladding is to be applied. After the primary structure is molded with this recess, the subsurface wire mesh layer 20 is applied, as above, and the nickel cladding is then applied, as described below, to bring the surface of the cladding even with the unrecessed surfaces of the airfoil portion.

In addition to the protection which the subsurface wire mesh layer 20 affords against damage by larger foreign objects, it also provides a firm anchor for the nickel cladding which may be applied as follows. As described earlier, the subsurface mesh layer 20 is bonded by adhesive to the filament/epoxy, primary structure 15 of the blade. The outer surface of this mesh layer is abraded to remove the adhesive from its nubs. Next the wire mesh layer is immersed in hydrochloric acid to remove the aluminum powder from the surface of the epoxy adhesive in the interstices of the mesh. A 10 minute immersion in a 15 percent, by weight, hydrochloric acid bath is sufficient for this purpose. Next the nubs of the stainless steel wire are anodically etched in a sulphuric-hydrofluoric acid solution. Then a nickel strike is applied and the part rinsed.

Figure 13:
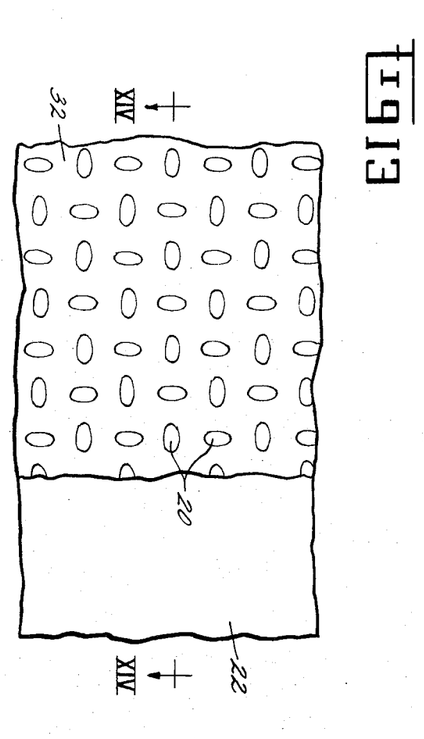
FIG. 13 is a view, on a greatly enlarged scale and with portions broken away of a protective surface formed on the blade.
Figure 14:
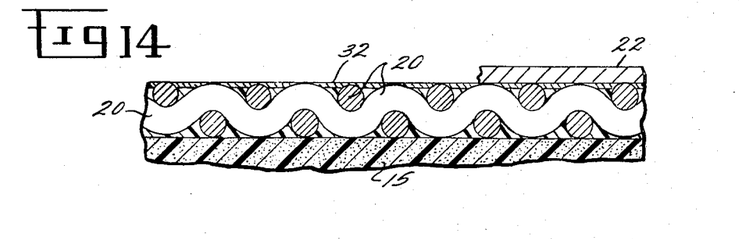
FIG. 14 is a section taken on line XIV—XIV in FIG. 13.

At this point a preferred feature of the invention is the application of a thin layer 32 of conductive metal to the adhesive in the interstices of the wire mesh 20. This may be accomplished by a silver reduction method wherein silver nitrate in an ammonia solution and a reducer, such as formaldehyde, are simultaneously sprayed on the surface of the wire mesh layer 20 (FIGS. 13 and 14). The silver is then removed from the nubs of the wire mesh. Finally, the mesh layer is clad with nickel by electroplating. The electroplating is selectively controlled to deposit the nickel to a nominal thickness of 0.025 inches at the leading edge tapering to a nominal thickness of 0.005 inches at the trailing edges of the mesh layer. The silver gives a continuous conductive path over the subsurface mesh layer so that there will be a uniform deposition of nickel during the plating operation and a resulting smooth surface of the nickel cladding with little or no stress concentrations. While the adhesion of the silver to the epoxy adhesive is relatively poor, the multiplicity of atomic bonds between the nickel and the nubs of the wire mesh firmly attach the cladding to the mesh which, in turn, is firmly anchored to the primary structure.

The thickness of the nickel cladding may be varied from about 0.002 to 0.050 inches. Generally, its thickness should be greater at the leading edge, tapering to a lesser thickness at its trailing edges. Further, while nickel is a preferred cladding, other hard metals can be employed, in addition or in the alternative, within the broader aspects of the invention.

To further characterize the wire mesh employed in the layers 20 and 24, the wire material should be tough, i.e., have a relatively high strain energy. Most stainless steels and titanium alloys fall in this category as well as other materials recognized by those skilled in the art. The diameter of the wire in the mesh and the related total thickness of the mesh should be no more than about 0.005 and 0.010, respectively. The minimum wire diameter and mesh thickness should be no less than about 0.001 and 0.002, respectively. A third characteristic of the mesh is the size of its interstices. This can best be expressed in terms of the volume percent of wire metal within the mesh outline which percent should be between about 20 and 60 percent.

Within the restraints outlined above, the wire mesh layers give outstanding protection to the blades from larger foreign objects. The mesh layers absorb impact energy not only because of the serpentine nature of the wires but also because of the relative flexibility that they provide, particularly in the area of greatest impact velocity, i.e., at tip end portion of the leading edge. The nickel cladding 22 is also effective in combination with the subsurface mesh layer 20 in maintaining the structural integrity of the blade when it is impacted by larger foreign objects.

Another factor relevant to impact absorption capability is the angling of the mesh wires at 45° (FIG. 1) relative to the leading edge of the blade. This orientation, upon impact of a large foreign object, results in a "scissoring" action between the wires of the mesh which enhances its energy absorption capabilities. This orientation feature also facilitates blade manufacture inasmuch as the mesh, when so oriented, will readily conform to the compound curvature of the blade which is apparent from FIGS. 2 and 3.

The described blade has demonstrated superior ability to withstand foreign object (both large and small) damage. Such capabilities have been demonstrated to be substantially equivalent to homogeneous titanium blades. Beyond this it possesses strength characteristics capable of operating in the highly loaded stress field of compressor rotors as well as under widely varying temperature ranges encountered by gas turbine engines employed in the propulsion of aircraft. Operating temperatures may vary as much as 400° F for first stage fan blades. The mesh of the protection system primarily affords an energy absorption capability on impact by larger foreign objects. The nickel cladding additionally tends to maintain the integrity of the wire mesh when so impacted. This capability prevents, or at least minimizes, the likelihood of fragments of the blade being torn loose and causing further damage. The subsurface layer of mesh provides an anchor for the nickel cladding which, in turn, provides the primary protection against erosion damage by smaller foreign objects. Even if the nickel cladding is eroded away, the outer mesh layer provides at least temporary erosion protection to the much more vulnerable epoxy substrate. This leads to another factor, namely that the nickel cladding, over a prolonged period of use, will eventually be worn away. The blade, however, can be reclad with nickel and the polyurethane layer replaced so that the service life of the blade can be extremely long.

While the above description has been directed to a foreign object damage protection system for graphite filament/resin blades, certain aspects of the invention may be advantageously employed in other composite filament blades. To illustrate, another advanced composite system employs boron filaments in an aluminum matrix. The boron filaments, which are now commercially available, have similar high strength and high modulus of elasticity to that of graphite filaments. The boron filaments also have the capability of operating at higher temperatures, hence their incorporation in an aluminum matrix. Boron filaments, however, have a larger diameter (approximately 0.004 – 0.006) which limit their application in some cases.

Figure 12:
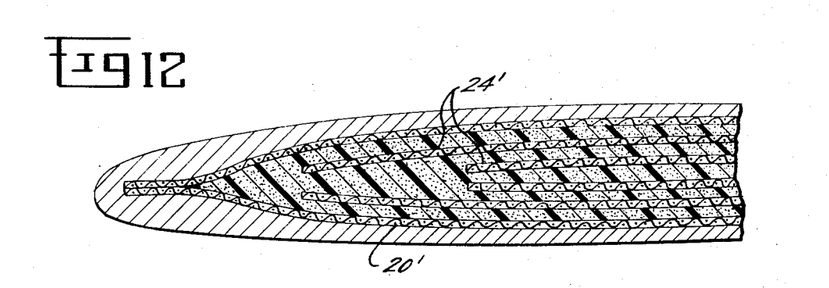
FIG. 12 is a section similar to FIG. 4 of another embodiment of the present invention.

Boron filaments can be incorporated in parallel fashion between sheets of aluminum in a fashion similar to the graphite/epoxy sheet of FIG. 6. Laminates can be cut from such sheets and assembled as per FIG. 8. This assembly can then be molded with internal and subsurface mesh layers, 24' and 20', substantially as described in connection with the graphite/epoxy blade. In an aluminum matrix, it is preferred to mold the subsurface mesh layer 20' into the primary structure rather than applying it in a subsequent operation. This is accomplished by forming the subsurface layer from two separate pieces of mesh as can be seen in FIG. 12. The molding pressure, along with applied heat, causes the aluminum to flow and diffusion bond into a solid matrix for the boron fibers and wire mesh.

Since the aluminum matrix material is electrically conductive and is capable of forming an atomic bond with electroplated nickel, the nickel cladding may be applied to the aluminum surface of the blade — this surface resulting from the diffusion of the aluminum in the molding operation. However, for operation at higher temperatures, it may be preferred to abrade away or otherwise remove the aluminum material to expose the nubs of the outer mesh layer so that an atomic bond can be obtained therewith in electroplating the nickel cladding.

FIG. 12 also illustrates another feature of the invention which enables fabrication of extremely high tip speed blades requiring small radius, or sharp, leading edges. The wire mesh pieces, forming the subsurface layer, are extended over the leading edge to form a structural base for the nickel plated cladding. By selective deposition of the nickel, a thin, sharp leading edge can be formed. This edge can also be machined to accurately generate the desired radius.

The preferred blades of the present invention incorporate graphite filaments of 0.0002 inches diameter or boron filaments of 0.003 – 0.006 inches diameter. However, other high strength, high modulus of elasticity filaments may also be advantageously employed. This includes such filament materials as silicon carbide and $Al_2O_3$ and filament diameters ranging from about 0.0001 to 0.010 inches. While epoxy resin and aluminum have been described as matrix materials and bonding agents, their selection and alternatives therefore are well within the capabilities of those skilled in the art.

In the broader aspects of the invention, the foreign object damage protection would be applicable to static, composite engine structures, such as vanes and struts, as well as aircraft structures, such as radomes. Static engine structures, particularly those disposed within the air flowpath, require protection from foreign object damage, though generally not to the degree required for rotating blades. Also the operating stresses on static structures are lower and/or are of a different nature. Thus, the composition of the composite materials and their orientation will usually be different than what is employed for blades. However, the use of wire mesh at the structure's subsurface with a nickel cladding thereover and the optional use of internal mesh layers may readily be adapted, through the present teachings, to such structures. Where the composite matrix material is non-conductive, the described technique of electroplating a nickel cladding to the exposed nubs of a wire mesh layer provides the necessary anchoring of the nickel layer to prevent separation thereof. This concept can also be used for non-conductive structures, in general, where a hard surface is required in a foreign object damage protection system.

Having thus described the invention what is claimed as novel and desired to be secured by Letters Patent of the United States is:

1. A composite compressor rotor blade having a cambered airfoil portion and an attachment tang at the hub end thereof, said airfoil portion comprising elongated, small diameter filaments, having high strength and high modulus of elasticity, a lightweight matrix in which the filaments are composited, said filaments forming the major portion of said airfoil portion, a subsurface, wire mesh layer extending from one side to the other of the airfoil portion at least marginally of its leading edge and from its tip end a substantial distance toward its hub end, said wire mesh being closely woven of small diameter wire with its interstices filled with a bonding agent that is bonded to the matrix, and a hard metal cladding bonded to the airfoil in overlying relation with the subsurface wire mesh, wherein the matrix and bonding agent are of non-conductive polymeric resin, a thin metal layer overlays the bonding agent in the interstices of the wire mesh between the nubs to which the hard metal cladding is bonded, the wire mesh is wrapped, uninterruptedly around the leading edge with its wires disposed at approximately 45° relative to the leading edge, the filaments are graphite having a diameter of approximately 0.0002 inch, the matrix is an epoxy resin, the wire mesh layer is approximately 100 mesh with a wire diameter of about 0.0045 inch, the bonding agent is an epoxy resin filled with aluminum powder, the hard metal cladding is nickel having a ductility greater than the ductility of the epoxy/filament structure and a thickness of about 0.015 to 0.025 inch at the leading edge tapering to about 0.002 to 0.005 inch at its trailing edge portions, and further comprising a plurality of internal wire mesh layers disposed generally parallel to the sides of the blade and with its wires at 45° relative to the leading edge, said internal mesh layers having the same characteristics as the subsurface layer, said internal mesh layers being adjacent the leading edge and extending therefrom a relatively short distance.

2. A composite compressor rotor blade having a cambered airfoil portion and an attachment tang at the hub end thereof, said airfoil portion comprising elongated, small diameter filaments, having high strength and high modulus of elasticity, a lightweight matrix in which the filaments are composited, said filaments forming the major portion of said airfoil portion, a subsurface, wire mesh layer extending from one side to the other of the airfoil portion at least marginally of its leading edge and from its tip end a substantial distance toward its hub end, said wire mesh being closely woven of small diameter wire with its interstices filled with a bonding agent that is bonded to the matrix, and a hard metal cladding bonded to the airfoil in overlying relation with the subsurface wire mesh, and at least one internal layer of wire mesh of substantially the same characteristics as said subsurface layer, said internal mesh layer being generally parallel to an adjacent surface of the airfoil section with its interstices filled with a bonding agent bonded to the matrix, said internal mesh layer being adjacent the leading edge, extending from the tip end thereof a substantial distance toward the hub and having a relatively short width.

3. A blade as in claim 2 further comprising additional internal mesh layers similar to said one internal mesh layer in characteristics and disposition, the trailing edges of said internal mesh layers being offset from each other so that no more than two trailing edges are registered in the general plane of the blade.

4. A blade as in claim 2 wherein the subsurface and internal mesh layers are square woven and the wires thereof are disposed at approximately 45° relative to the leading edge of the blade.

5. A structure intended for use in an environment to which it is subject to foreign object damage, said structure comprising a non-conductive primary structure, a subsurface, closely woven, small diameter wire mesh layer bonded to said primary structure by a bonding agent filling the interstices of the wire mesh, a hard metal cladding atomically bonded to the outer nubs of the wire mesh, wherein the wire mesh is formed of tough metal wire mesh having a diameter of about 0.001 to 0.005 inches and about 20 to 60 volume percent of wire metal within the outline of the mesh layer, the wire metal is selected from the group consisting of stainless steel and titanium and its alloys the metal cladding is nickel having a thickness between about 0.002 and 0.050 inches.

* * * * *